United States Patent [19]

Sebillotte et al.

[11] Patent Number: 5,392,190
[45] Date of Patent: Feb. 21, 1995

[54] MANUFACTURING PROCESS OF A CAPACITOR WITH DELAYED AGEING AND A CAPACITOR MANUFACTURED ACCORDING TO THIS PROCESS

[75] Inventors: Alain Sebillotte, Epagny; Serge Theoleyre, Aix les Bains, both of France

[73] Assignee: Merlin Gerin, France

[21] Appl. No.: 986,766

[22] Filed: Dec. 8, 1992

[30] Foreign Application Priority Data

Dec. 18, 1991 [FR] France ................. 91 15847

[51] Int. Cl.⁶ .................................... H01G 4/08
[52] U.S. Cl. ........................ 361/323; 361/525; 29/25.03
[58] Field of Search ........... 361/323, 525, 315, 313; 29/25.03

[56] References Cited

U.S. PATENT DOCUMENTS 3,622,848 11/1971 Hendrix .
3,649,892 3/1972 Booe ............................ 361/313
5,153,820 10/1992 MacFarlane et al. ......... 361/525

FOREIGN PATENT DOCUMENTS 2024636 8/1970 France .

OTHER PUBLICATIONS

World Patents Index, Section Ch, Week 7805, Feb. 1978, JP-A-52 153 150, p. 1/1.

*Primary Examiner*—Marvin M. Lateef
*Attorney, Agent, or Firm*—Parkhurst, Wendel & Rossi

[57] ABSTRACT

The manufacturing process of a capacitor with a polypropylene dielectric film by introducing pre-cross-linking elements of the polypropylene at the time of manufacturing. When the capacitor is used, the electrical field and/or temperature generated trigger the cross-linking process of the polypropylene, delaying and slowing down the ageing phenomena, i.e. the decrease of the dielectric strength. The pre-cross-linking agent is a polyfunctional monomer to which an activation accelerator and/or a stabilizing agent can be added.

18 Claims, No Drawings

MANUFACTURING PROCESS OF A CAPACITOR WITH DELAYED AGEING AND A CAPACITOR MANUFACTURED ACCORDING TO THIS PROCESS

The invention relates to a manufacturing process of a capacitor comprising one or more windings having two metal armatures separated by one or more polypropylene films.

In power capacitors, polypropylene is mainly used as dielectric material, inserted between metal armatures. The armatures can be formed by sheets of aluminium foil wound with the polypropylene film or films or be formed by a metal coating of one or both faces of the polypropylene film. The winding formed by the coil of the armatures and polypropylene is generally impregnated with a dielectric liquid, but the invention is applicable to dry capacitors in which the winding is arranged in air or in a high dielectric strength gas, notably sulphur hexafluoride.

The coil can also be located in a solid medium, in particular in greases.

It has been noted that the above-mentioned capacitors present ageing in the course of use resulting in a decreased dielectric strength, and in internal breakdowns which quickly make the capacitor inoperational.

The object of the present invention is to achieve a manufacturing process of a capacitor whose ageing is delayed.

The manufacturing process according to the invention is characterized in that, in the manufacturing stage, pre-crosslinking elements of the polypropylene are introduced comprising a polyfunctional monomer having chain functions which once they have been activated, make a chemical bond with macro-molecular polypropylene chains and that cross-linking of the polypropylene is generated by the action of an electrical field and/or temperature in the course of use of the capacitor, so as to reduce the degradation of the dielectric strength of the polypropylene film.

Ageing of the capacitor is essentially due to degradation of the polypropylene which gives rise to a decrease of the dielectric strength. By generating according to the invention cross-linking of the polypropylene in the course of use of the capacitor, a notable decrease of the ageing phenomenon and of breakdowns due to this ageing is observed. The object of cross-linking of the polypropylene is to create chemical bonds between the macromolecular chains to obtain a three-dimensional lattice which improves the properties of the polypropylene. Polyfunctional monomers, which are small organic chains having chemical functions which once activated can make chemical bonds with the macromolecular chains of the polypropylene, are incorporated in the polypropylene. The cross-linking mechanism requires in addition an energy input to create these new chemical bonds and according to the invention this energy is produced by the electrical field and/or the temperature generated in the course of use of the capacitor. The invention consists in using a non-cross-linked polypropylene and in creating the conditions favorable for cross-linking by adding polyfunctional monomers. A pre-cross-linked polypropylene is thus created, cross-linking of which is instigated and then maintained by an energy input supplied when the capacitor is used. The dielectric strength of the polypropylene is thus stabilized in the course of operation of the capacitor whose lifetime is thus notably improved.

The polyfunctional monomers or bonding agents used are molecules or chemical compounds which have one or more chemical functions able to create a chemical bond with the polypropylene in the presence of an activating energy. The polyfunctional monomer has one or more of the following characteristics:

- it is an organic macromolecule of low molecular weight, with an olefinic structure comprising double bonds such as polybutadiene for example,
- it comprises a vinyl group such as trimethoxysilane vinyl for example,
- it comprises an acrylyl group or an acrylate group (acrylic acid) such as for example: tetramethylolmethane tetraacrylate, trimethylolpropane triacrylate, 1.6 hexaneoglycoldiacrylate,
- it comprises an isocyanato group or a cyanato group or a cyanuric cycle or a cyanurate cycle (cyanuric acid) such as for example: triallyl isocyanurate, triallyl cyanurate,
- it comprises an ether with an allyl group such as allyl ether of glycerine for example,
- it comprises a cyclic ketone or a biketone (quinone) such as p-benzoquinone for example,
- it comprises a phenoxy group such as phenol for example,
- it comprises a phenylenedioxy group such as hydroquinone for example,
- it comprises an epoxy cycle such as for example: bisphenol A diglycidylether, 3–4 epoxy cyclo hexyl methyl-3-4-epoxy cyclohexane carboxylate.

According to a development of the invention, the cross-linking mechanism is enhanced by the use of activation accelerators which are chemical molecules easy to activate and to form a radical which will transfer its activation to the bonding zones.

The activation accelerator is advantageously chosen from the following products:

benzoyl peroxide
di-tert-butyl peroxide
dicumyl peroxide
1.4-di-tert-butylperoxy diisopropyl benzene
2.5-dimethyl- 2.5-di-tert-butyl peroxyhexyne
tert-butyl perbenzoate.

In order to guide all these activated species towards a cross-linking process, it is advantageous to add an antioxidant product, notably molecules or chemical compounds having properties inhibiting degradation of the polypropylene. These products moreover have the advantage of stabilizing the cross-linked polymer and they are notably chosen from the following products:

2.6-di-tert-butyl-4 methyl phenol
methylene 3-(3',5'-di-tert-butyl-4-hydroxyphenyl) - propionate
hydroxybenzophenone.

The invention relates to a capacitor achieved according to the process described above, this capacitor being characterized in that it incorporates pre-cross-linking elements and that the cross-linking operation of the polypropylene is instigated and maintained by the action of the electrical field and/or the temperature.

The pre-cross-linking agents or elements can be incorporated in the capacitor at different stages of its manufacture. When the capacitor comprises a dielectric impregnation liquid, the pre-cross-linking elements are preferably mixed with this dielectric liquid which is in contact with the polypropylene. The pre-cross-linking elements can also be incorporated at any time in the polypropylene transformation chain from its production in the form of basic resin through to its implementation to constitute a capacitive element of the capacitor. A polypropylene film is thus achieved containing all the elements for cross-linking when used in a capacitor, and this polypropylene film can be used in all types of capacitors, with or without impregnation liquid, with gas or solid insulation. The pre-cross-linking elements can also be incorporated when winding of the capacitor element is carried out, for example by powdering or any other operative means, bringing these pre-cross-linking elements into contact with the polypropylene.

Two examples of capacitors whose ageing has been improved by the process according to the invention are given below:

EXAMPLE 1

The power capacitor is formed by a set of wound elements which comprise two electric armatures in the form of metal strips between which a dielectric insulator is inserted in the form of polypropylene films. The wound elements are impregnated with a dielectric liquid, notably with a mixture of mono and dibenzyl-toluene. To limit degradation of the polypropylene films by the electrical field, the pre-cross-linking elements are incorporated in the capacitor at the time of impregnation. The impregnation liquid contains the following additives:

dicumyl peroxide, i.e. bis ($\alpha$, $\alpha$- dimethyl benzyl) peroxide at 2% weight
vinyl trimethoxysilone at 4% weight
2.6-di-tert-butyl-4-methyl phenol at 1% weight

EXAMPLE 2

The power capacitor is formed by a set of wound elements which comprise two alternately wound metallized polypropylene films. To limit degradation of the polypropylene films by the electrical field, the following additives are incorporated homogeneously in the material at the time the polypropylene film is achieved:

benzoyl peroxide at 2% weight
1.4 benzoquinone at 1% weight

The invention is not limited to the process more particularly described herein, and can be applied to low voltage or medium and high voltage capacitors.

We claim:

1. A process for manufacturing a capacitor having at least one winding having two metal armatures separated by at least one polypropylene film wherein said polypropylene film has an improved resistance to degradation of the dielectric strength of the polypropylene film during use of the capacitor, said process comprising
   (a) providing a winding element, two metal armatures, a non-crosslinked polypropylene film, and polypropylene pre-cross-linking elements defined in (c) herein;
   (b) forming a capacitor having at least one winding having two metal armatures separated by at least one non-cross linked polypropylene film; and
   (c) incorporating polypropylene pre-cross-linking elements into said capacitor, said pre-cross-linking elements comprising a polyfunctional monomer having chain functions that, once they have been activated by an electrical field and/or heat during use of the capacitor, make a chemical bond with macromolecular polypropylene chains in the polypropylene film, whereby cross-linking of the polypropylene is generated by the action of an electrical field and/or heat in the course of use of the capacitor, so as to reduce the degradation of the dielectric strength of the polypropylene film, said capacitor having improved resistance to ageing caused by a decrease in dielectric strength, said improved resistance caused by formation of cross-links between said polypropylene pre-cross-linking elements and said polypropylene film during use of the capacitor.

2. The process of claim 1, further comprising adding an activation accelerator to said polyfunctional monomer.

3. The process of claim 1, further comprising adding a stabilizing agent to said polyfunctional monomer.

4. The process of claim 1, wherein said polyfunctional monomer has at least one of the following characteristics:

said monomer is an organic macromolecule of low molecular weight, with an olefinic structure comprising double bonds such as polybutadiene;

said monomer comprises a vinyl group such as trimethoxysilane vinyl;

said monomer comprises an acrylyl group or an acrylate group (acrylic acid) such as tetramethylolmethane tetraacrylate, trimethylolpropane triacrylate, or 1,6-hexaneglycoldiacrylate;

said monomer comprises an isocyanato group or a cyanato group or a cyanuric cycle or a cyanurate cycle (cyanuric acid) such as triallyl isocyanurate or triallyl cyanurate;

said monomer comprises an ether with an allyl group such as allyl ether of glycerine;

said monomer comprises a cyclic ketone or a biketone (quinone) such as p-benzoquinone;

said monomer comprises a phenoxy group such as phenol;

said monomer comprises a phenylenedioxy group such as hydroquinone; and said monomer comprises an epoxy cycle such as bisphenol A diglycidylether or 3,4 epoxy cyclohexyl methyl-3,4-epoxy cyclohexane carboxylate.

5. The process of claim 1, comprising mixing said pre-cross-linking elements with a dielectric liquid for impregnation of the winding.

6. The process of claim 1, comprising incorporating said pre-cross-linking elements into the polypropylene film when said film is manufactured.

7. The process of claim 1, comprising depositing said pre-cross-linking elements on the polypropylene film in the course of a winding operation.

8. The process of claim 4, wherein said monomer is polybutadiene.

9. The process of claim 4, wherein said monomer is trimethoxysilane vinyl.

10. The process of claim 4, wherein said monomer is tetramethylolmethane tetracrylate, trimethylolpropane triacrylate, or 1,6-hexaneglycoldiacrylate.

11. The process of claim 4, wherein said monomer is triallyl isocyanurate or triallyl cyanurate.

12. The process of claim 4, wherein said monomer is the allyl ether of glycerine.

13. The process of claim 4, wherein said monomer is p-benzoquinone.

14. The process of claim 4, wherein said monomer is phenol.

15. The process of claim 4, wherein said monomer is hydroquinone.

16. The process of claim 4, wherein said monomer is bisphenol A diglycidylether or 3,4-epoxy cyclohexyl-methyl-3,4-epoxycyclohexane carboxylate.

17. A capacitor made by the process of claim 1, having incorporated therein said pre-cross-linking elements and wherein a cross-linking operation of the polypropylene is instigated and maintained in the course of operation of the capacitor by the action of an electrical field and/or heat.

18. The capacitor of claim 17, formed by a coil of metallized polypropylene films.

* * * * *